United States Patent [19]

Birsching

[11] Patent Number: 5,482,132
[45] Date of Patent: Jan. 9, 1996

[54] PINION HEAD FOR POWER STEERING GEAR

[76] Inventor: Joel E. Birsching, 5833 Bay Park Rd., Unionville, Mich. 48767

[21] Appl. No.: 451,340

[22] Filed: May 26, 1995

[51] Int. Cl.$^6$ .................... B62D 3/12; B62D 5/22
[52] U.S. Cl. ............ 180/148; 74/498; 91/375 A; 180/149
[58] Field of Search .................... 180/141, 148, 180/149; 91/375 A; 74/498

[56] References Cited

U.S. PATENT DOCUMENTS

| | | | |
|---|---|---|---|
| 4,454,801 | 6/1984 | Spann | 91/375 A |
| 5,058,696 | 10/1991 | Prebay et al. | 180/141 |
| 5,070,957 | 12/1991 | Harkrader et al. | 180/141 |
| 5,272,933 | 12/1993 | Collier et al. | 180/148 |

Primary Examiner—Mitchell J. Hill

[57] ABSTRACT

A pinion head for a rack and pinion power steering gear including a pinion gear having hob-formed gear teeth, a spindle at one end of the pinion gear for a ball bearing, an annular skirt at the other end of the pinion gear having an outer cylindrical surface, and an annular runout groove between the pinion gear and the outer cylindrical surface affording exit clearance for a gear hob. The ball bearing on the spindle is closely adjacent the first end of the pinion gear. A plastic sleeve is in sire injection molded onto the pinion head in the runout groove after the pinion gear teeth are hob-formed and includes an outer cylindrical wall defining an extension of the outer cylindrical surface of the skin terminating close to the second end of the pinion gear. The plastic sleeve defines a sleeve bearing on the pinion head on one side of the pinion gear which cooperates with the ball bearing on the other side of the pinion gear in rotatably supporting the pinion head on a housing of the steering gear.

1 Claim, 3 Drawing Sheets 5,482,132

PINION HEAD FOR POWER STEERING GEAR

FIELD OF THE INVENTION

This invention relates to rack and pinion power steering gears for motor vehicles.

BACKGROUND OF THE INVENTION

Motor vehicle rack and pinion power steering gears typically include a pinion gear rotatably supported on a housing and a rack bar supported on the housing for bodily movement generally perpendicular to the pinion gear. Gear teeth on the pinion gear mesh with rack gear teeth on the rack bar to shift the rack bar back and forth when the pinion gear rotates.

In the rack and pinion power steering gears described in U.S. Pat. Nos. 4,454,801 and 4,788,877, issued 19 Jun. 1984 and 6 Dec. 1988 and assigned to the assignee of this invent referred to as a pinion head, includes a spindle at one end and an annular skirt at the other end having an outer cylindrical surface. A ball bearing between the steering gear housing and the spindle cooperates with a sleeve bearing on the housing around the outer cylindrical surface of the skin in rotatably supporting the pinion head on the housing. To minimize the overall size of the steering gear and to minimize the unsupported span of the pinion gear, the ball bearing is closely adjacent a first end of the pinion gear and the outer cylindrical surface on the skin terminates at an annular shoulder closely adjacent a second end of pinion gear. In this construction, the pinion gear teeth are formed by a rolling process. Hobbing, a gear tooth forming process yielding gear teeth of improved quality, requires more clearance between the second end of the pinion gear and the annular shoulder on the skin than is available in this construction and, therefore, cannot be used without increasing the length of the pinion head and the unsupported span of the pinion gear.

SUMMARY OF THE INVENTION

This invention is a new and improved pinion head for a rack and pinion power steering gear having substantially the same length as the pinion heads of the steering gears described in the aforesaid U.S. Pat. Nos. 4,454,801 and 4,788,877, and including a pinion gear having hobbed gear teeth, a spindle at one end of the pinion gear for a ball bearing, an annular skin at the other end of the pinion gear having an outer cylindrical surface, and an annular runout groove in the skin affording clearance for a gear hob during manufacture of the pinion gear teeth. The ball bearing on the spindle is closely adjacent a first end of the pinion gear.

A plastic sleeve is in situ injection molded on the pinion head in the runout groove after the pinion gear teeth are hobbed and includes an outer cylindrical wall defining an extension of the outer cylindrical surface on the skirt terminating close to a second end of pinion gear. The plastic sleeve defines a sleeve bearing on the pinion head on one side of the pinion gear which cooperates with the ball bearing on the other side of the pinion gear in rotatably supporting the pinion head on a housing of the steering gear with substantially the same unsupported pinion gear span as achieved in the steering gears described in the aforesaid U.S. Pat. Nos. 4,454,801 and 4,788,877.

DESCRIPTION OF PRIOR ART

Figure 1:
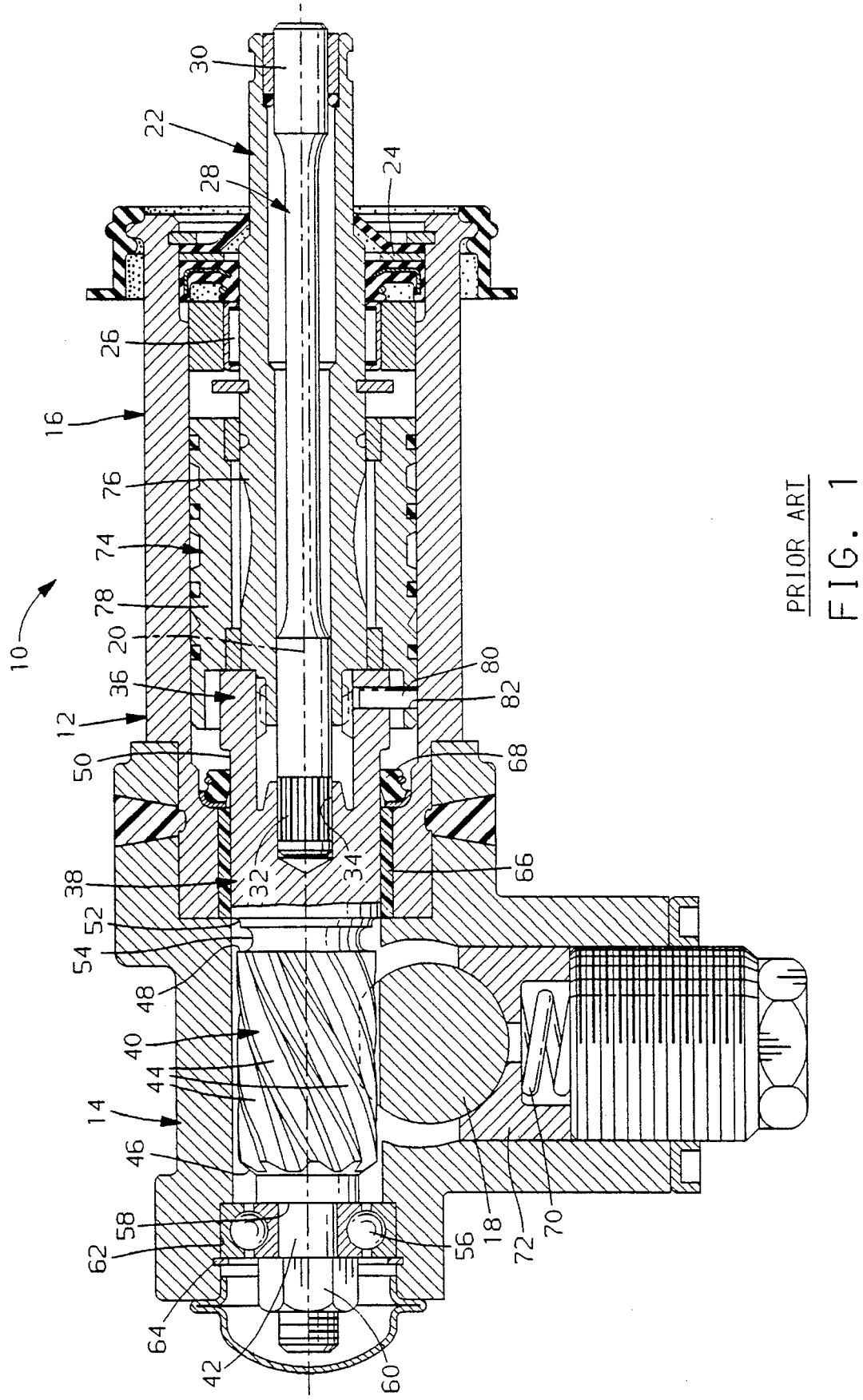
FIG. 1 is a longitudinal sectional view of a prior art rack and pinion motor vehicle power steering gear.

Referring to FIG. 1, a rack and pinion power steering gear 10, such as described in the aforesaid U.S. Pat. Nos. 4,454, 801 and 4,788,877, includes a housing 12 consisting of a rack housing 14 and a valve housing 16 rigidly connected to the rack housing. A rack bar 18 is supported on the rack housing 14 for bodily movement perpendicular to a longitudinal centerline 20 of the valve housing 16. Opposite ends, not shown, of the rack bar are connected to steerable wheels of the vehicle in conventional fashion, such that back and forth bodily movement of the rack bar steers the vehicle.

A tubular spool shaft 22 of the steering gear protrudes into the valve housing 16 through a cover 24 on the latter and is supported on the valve housing for rotation about the centerline 20 by a roller bearing 26. The spool shaft is connected to a manual steering wheel, not shown, of the motor vehicle for unitary rotation therewith. A torsion bar 28 inside the spool shaft has an outboard end 30 rigidly connected to the spool shaft by a pin, not shown. An inboard end 32 of the torsion bar is interference press fined in a socket 34 at the bottom of an annular skiff 36 of a pinion head 38 of the steering gear whereby the torsion bar is rigidly connected to the pinion head.

The pinion head 38 further includes a pinion gear 40 integral with the skin 36 and a spindle 42 integral with the pinion gear on the opposite side of the latter from the skirt. The pinion gear 40 has a plurality of gear teeth 44 each of which terminates at a first end 46 of the pinion gear facing the spindle and a second end 48 of the pinion gear facing the skirt. A root diameter dimension of the pinion gear teeth 44 exceeds the diameter of the spindle 42. An outer cylindrical surface 50 on the skin 36 of the pinion head terminates at an annular shoulder 52 closely adjacent the second end 48 of the pinion gear and separated therefrom by a narrow annular groove 54. The diameter of the outer cylindrical surface 50 exceeds the root diameter dimension of the pinion gear teeth.

An inner race of a ball bearing 56 is interference press fined on the spindle 42 against a shoulder 58 on the latter in close proximity to the first end 46 of the pinion gear and is retained by a nut 60 on the spindle. An outer race of the ball bearing is retained in a counterbore 62 in the rack housing 14 by a retaining ring 64. A plastic sleeve bearing 66 on the valve housing 16 bears against the outer cylindrical surface 50 of the skirt 36 near the annular shoulder 52 and cooperates with the ball bearing 56 in supporting the pinion head 38 on the steering gear housing 12 for rotation about the centerline 20 of the valve housing. An annular lip of a seal 68 on the valve housing 16 bears against the outer cylindrical surface 50 behind the sleeve bearing 66.

Manual effort applied at the steering wheel of the vehicle and transferred to the pinion head 38 through the torsion bar 28 rotates the pinion head about the centerline 20. The pinion gear teeth 44 mesh with a plurality of rack gear teeth, not shown, on the rack bar so that the rack bar is shifted back and forth perpendicular to the centerline 20 when the pinion head rotates. The rack gear teeth are urged into mesh with the pinion gear teeth by a spring 70 behind the rack bar 18 which bears against the latter through a slide block 72 on the rack housing 14. The proximity of the ball bearing 56 and the sleeve bearing 66 to the first and second ends 46,48 of the pinion gear minimizes the unsupported span of the pinion gear 40 for maximum rigidity. The pinion gear teeth are manufactured by a process in which the teeth are roll formed between the spindle 42 and the annular shoulder 52 on the annular skirt 36.

A rotary control valve 74 of the power steering gear 10 for directing hydraulic fluid to working chambers of a steering assist fluid motor, not shown, is generally as described in the aforesaid U.S. Pat. No. 4,454,801 and includes a valve spool 76 integral with the spool shaft 22 and a valve body 78 rotatably supported on the spool shaft around the valve spool. The valve body 78 is connected to the pinion head 38 for unitary rotation therewith by a radial pin 80 on the skin 36 of the pinion head received in a radial bore 82 in the valve body. Manual effort applied at the steering wheel of the vehicle twists the torsion bar 28 through an angle proportional to the applied manual effort. The control valve is actuated by relative rotation between the spool shaft 22 and the pinion head 38 corresponding to the twist of the torsion bar.

DESCRIPTION OF A PREFERRED EMBODIMENT

Figure 2:
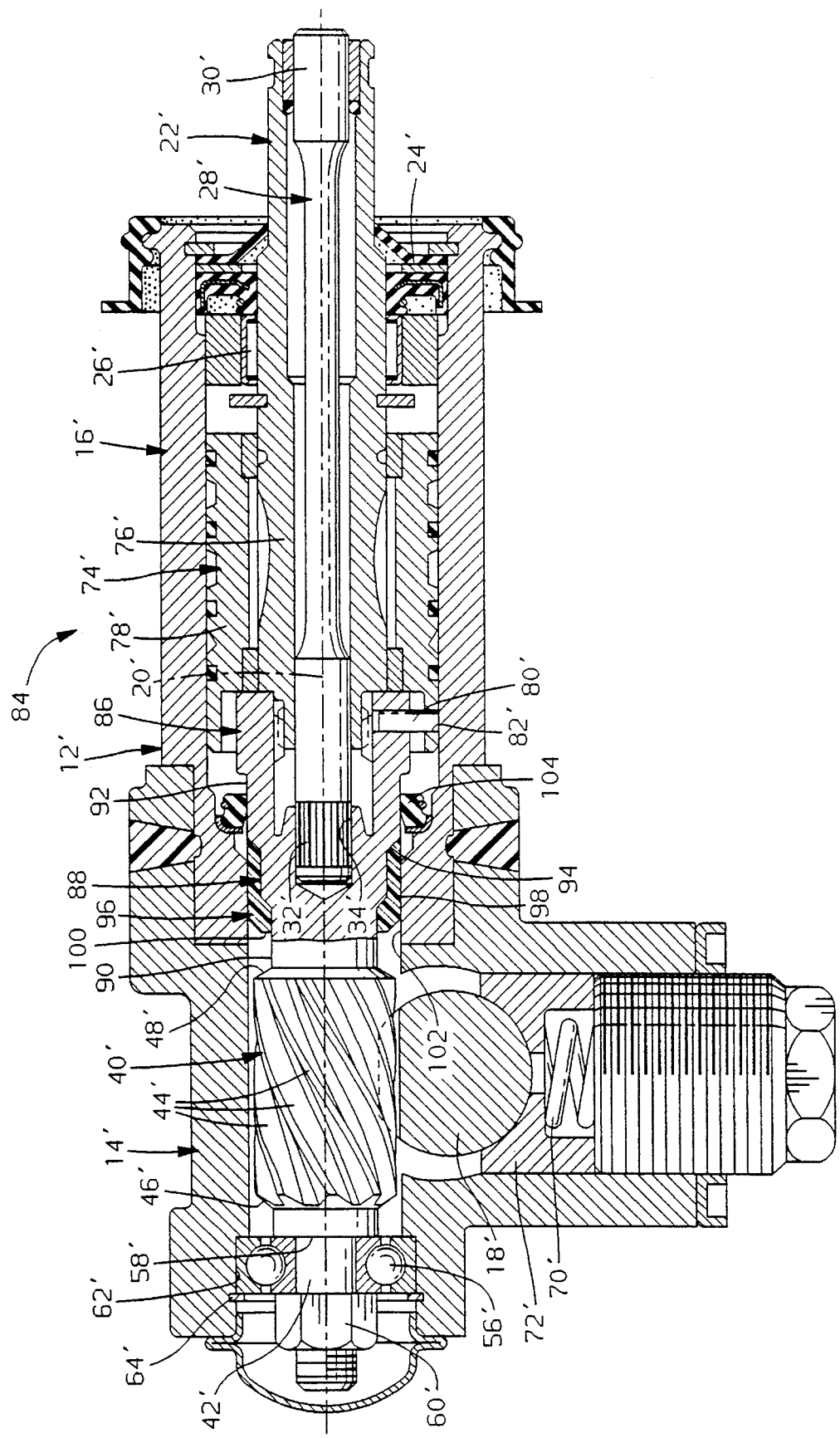
FIG. 2 is a longitudinal sectional view of a rack and pinion motor vehicle power steering gear having a pinion head according to this invention.
Figure 3:
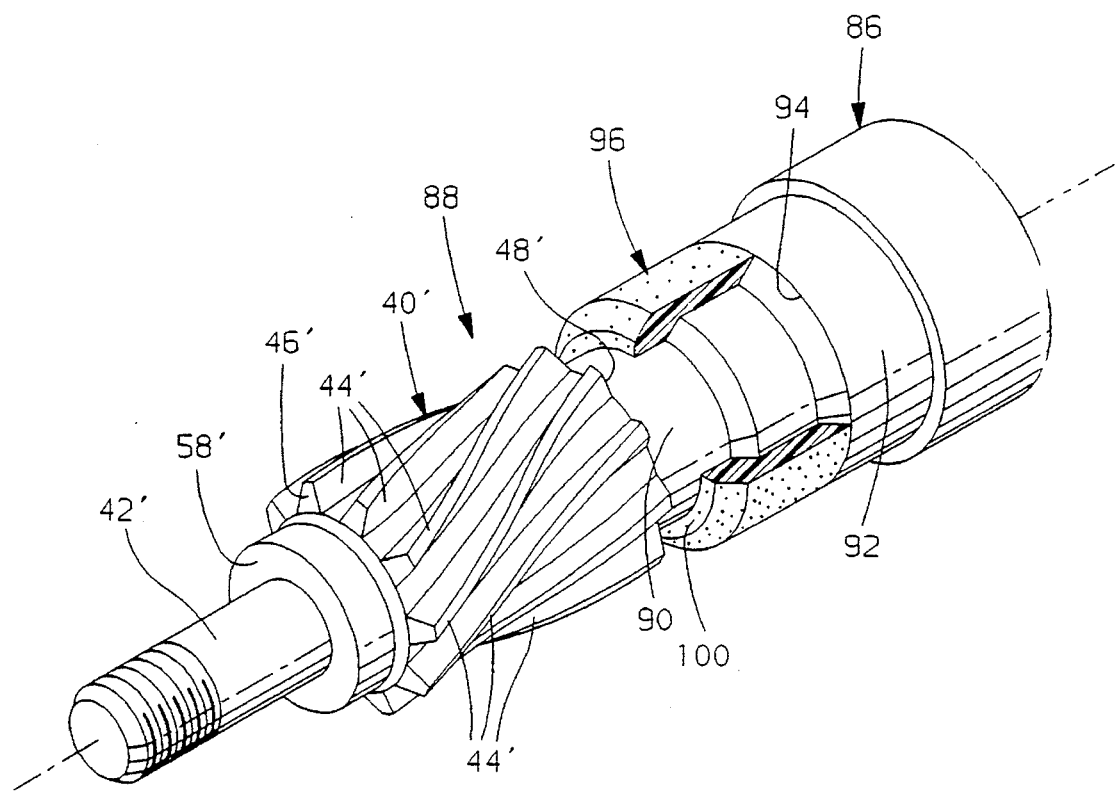
FIG. 3 is a fragmentary, partially broken-away exploded perspective view of a pinion head according to this invention.

FIG. 2 illustrates a rack and pinion power steering gear 84 like the rack and pinion power steering gear 10, except as described below. In FIGS. 2–3, structural elements common to both of the rack and pinion power steering gears 10,84, are identified by primed reference characters. The rack and pinion power steering gear 84 includes a housing 12' consisting of a rack housing 14' and a valve housing 16' rigidly connected to the rack housing. A rack bar 18' is supported on the rack housing 14' for bodily movement perpendicular to a longitudinal centerline 20' of the valve housing 16'.

A tubular spool shaft 22' of the steering gear protrudes into the valve housing 16' through a cover 24' on the latter and is supported on the valve housing for rotation about the centerline 20' by a roller bearing 26'. The spool shaft is connected to a manual steering wheel, not shown, of the motor vehicle for unitary rotation therewith. A torsion bar 28' inside the spool shaft has an outboard end 30' rigidly connected to the spool shaft by a pin, not shown. An inboard end 32' of the torsion bar is interference press fitted in a socket 34' at the bottom of an annular skirt 86 of a pinion head 88 according to this invention, whereby the torsion bar is rigidly connected to the pinion head.

The pinion head 88 has the same overall length as the pinion head 38 of the steering gear 10, and further includes a pinion gear 40' integral with the skin, a spindle 42' integral with the pinion gear facing a first end 46' of the pinion gear, an outer cylindrical surface 92 on the skirt, and a stepped annular runout groove 90 between the outer cylindrical surface 92 and a second end 48' of the pinion gear. The pinion gear 40' has a plurality of gear teeth 44' each of which terminates at the first end 46' of the pinion gear facing the spindle and at the second end 48' facing the runout groove.

The pinion gear teeth 44' are hob-formed for improved gear tooth quality relative to the roll formed pinion gear teeth 44 on the pinion head 38. The first end 46' of the pinion gear 40' is accessible to a gear hob around the outside of the spindle 42' due to the small diameter of the spindle. The runout groove 90 affords sufficient clearance at the second end 48' of the pinion gear for the gear hob to exit the pinion gear teeth 44' between the latter and the outer cylindrical surface 92 after finishing a forming pass yielding a pinion gear tooth fully formed between the first and second ends 46',48' of the pinion gear. The runout groove 90, however, truncates the outer cylindrical surface 92 so that an inboard end 94 thereof is further separated from the second end 48' of the pinion gear than is the corresponding end of the outer cylindrical surface 50 on the skin 36 of the pinion head 38 of the prior steering gear.

A plastic sleeve 96 is in situ injection molded onto the pinion head 88 in the runout groove 90 after the pinion gear teeth 44' are hob-formed. The plastic sleeve 96 is rigidly anchored to the pinion head and has an outer cylindrical wall 98 defining an extension of the outer cylindrical surface 92 of the skirt. The outer cylindrical wall 98 of the plastic sleeve terminates at an annular shoulder 100 separated from the second end 48' of the pinion gear by a distance which is substantially the same as the separation between the annular shoulder 52 and the second end 48 of the pinion gear 40 on the pinion head 38 of the prior steering gear.

An inner race of a ball bearing 56' is interference press fitted on the spindle 42' against a shoulder 58' on the latter in close proximity to the first end 46' of the pinion gear and is retained by a nut 60' on the spindle. An outer race of the ball bearing 56' is retained in a counterbore 62' in the rack housing 14' by a retaining ring 64'. The outer cylindrical surface 98 of the plastic sleeve 96 defines an anti-friction bearing between the pinion head and an inner wall 102 of the valve housing 16' which cooperates with the ball bearing 56' in supporting the pinion head 88 on the steering gear housing 12' for rotation about the centerline 20'. An annular lip of a seal 104 on the valve housing 16' bears against the outer cylindrical wall 92 behind the anti-friction bearing defined by the plastic sleeve 96.

Manual effort applied at the steering wheel of the vehicle and transferred to the pinion head through the torsion bar 28' rotates the pinion head 88 about the centerline 20'. The pinion gear teeth 44' mesh with a plurality of rack gear teeth, not shown, on the rack bar so that the rack bar is shifted back and forth perpendicular to the centerline 20' when the pinion head rotates. The rack gear teeth are urged into mesh with the pinion gear teeth by a spring 70' behind the rack bar 18' which bears against the latter through a slide block 72' on the rack housing 14'. The ball bearing 56' and the outer cylindrical wall 98 of the plastic sleeve 96 are separated by about the same distance as the ball bearing 56 and the outer cylindrical surface 50 of the pinion head 38 of the prior steering gear 10 to achieve pinion gear rigidity comparable to that achieved in the prior steering gear.

A rotary control valve 74' of the power steering gear 84 for directing hydraulic fluid to working chambers of a steering assist fluid motor, not shown, includes a valve spool 76' integral with the spool shaft 22' and a valve body 78' rotatably supported on the spool shaft around the valve spool. The valve body 78' is connected to the pinion head 88 for unitary rotation therewith by a radial pin 80' on the skirt 86 of the pinion head received in a radial bore 82' in the valve body.

The runout groove 90 and the plastic sleeve 96 therein are important features of the pinion head 88 according to this invention because they cooperate to yield a pinon head having the advantage of hobbed pinion gear teeth without the disadvantage of increasing the length of the pinion head to accommodate a runout for the gear hob and without the further disadvantage of increasing the unsupported span of the pinion gear.

I claim:

1. A pinion head for a rack and pinion power steering gear including a pinion gear, a spindle integral with said pinion gear at a first end thereof, and an annular skirt integral with said pinion gear at a second end thereof having an outer cylindrical surface, characterized in that said pinion head further comprises:

a plurality of hob-formed pinion gear teeth on said pinion gear extending between said first end and said second end thereof having a root diameter dimension less than the diameter of said outer cylindrical surface, a hob runout groove in said annular skin affording exit clearance for a tooth-forming gear hob between said second end of said pinion gear and said outer cylindrical surface, and an in situ injection molded plastic sleeve rigidly attached to said pinion head in said hob runout groove having an outer cylindrical wall defining an extension of said outer cylindrical surface of said annular skirt and terminating at an annular shoulder facing said second end of said pinion gear.

* * * * *